March 5, 1940.  A. L. QUINLAN  2,192,694
WINDING MACHINE
Filed Feb. 17, 1938  2 Sheets-Sheet 1
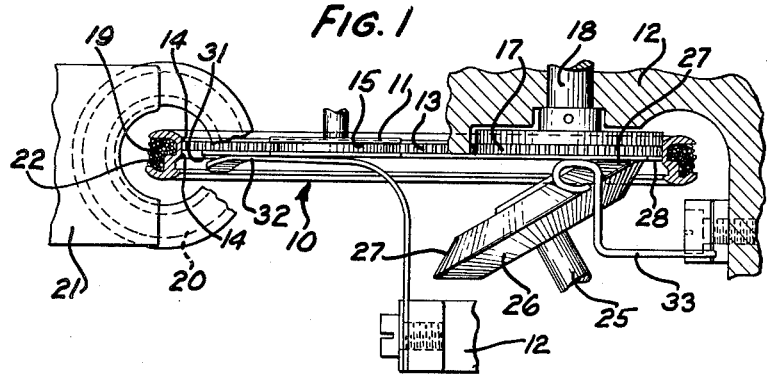
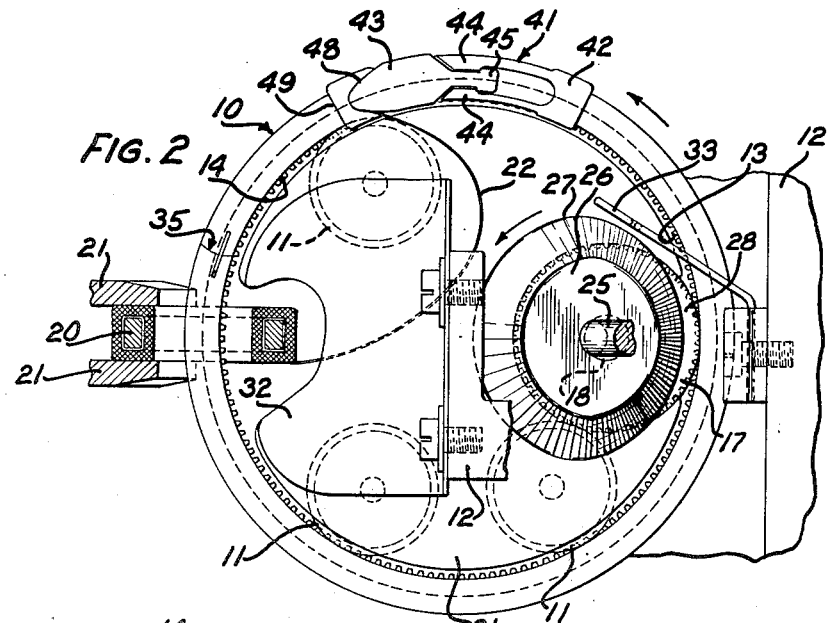
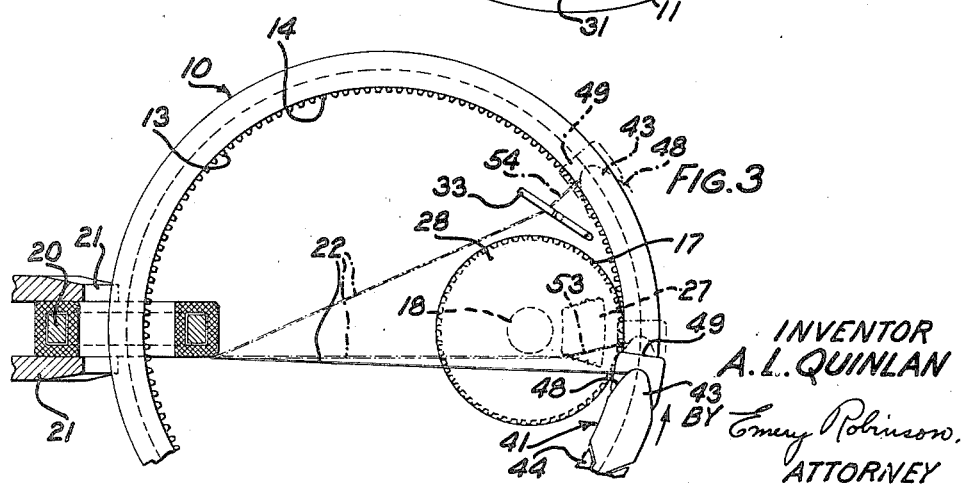
INVENTOR
A. L. QUINLAN
BY Emery Robinson
ATTORNEY March 5, 1940.  A. L. QUINLAN  2,192,694
WINDING MACHINE
Filed Feb. 17, 1938  2 Sheets-Sheet 2
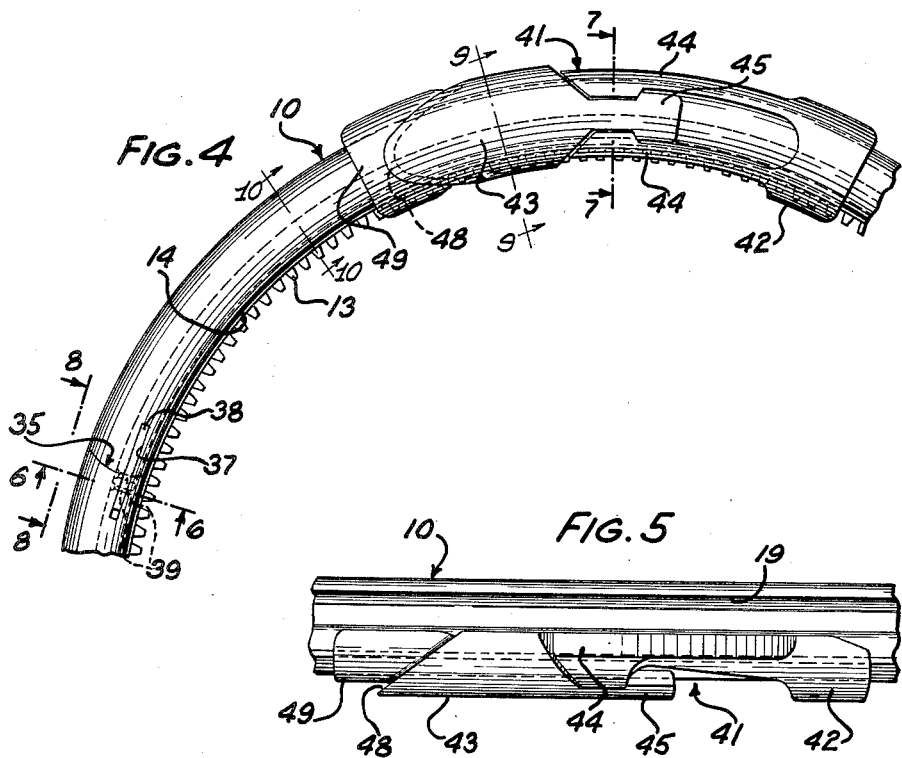
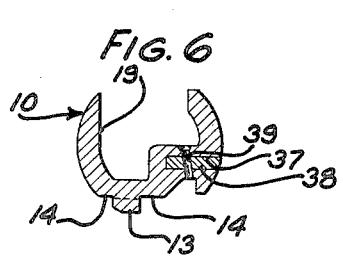
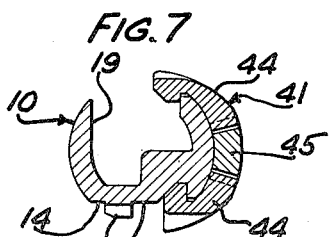
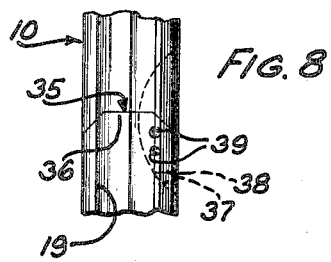
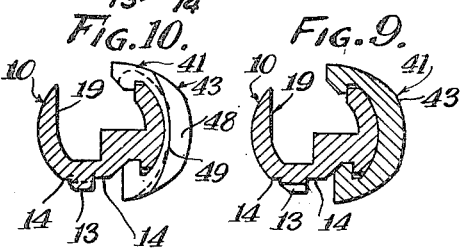
INVENTOR
A. L. QUINLAN
BY Emery Robinson
ATTORNEY Patented Mar. 5, 1940

2,192,694

UNITED STATES PATENT OFFICE 2,192,694

WINDING MACHINE

Amos L. Quinlan, La Grange, Ill., assignor to Western Electric Company, Incorporated, New York, N. Y., a corporation of New York Application February 17, 1938, Serial No. 190,957

14 Claims. (Cl. 242—4)

This invention relates to winding machines, and more particularly to a machine for winding material spirally upon annular objects.

Winding machines have been found particularly useful in winding wire spirally upon closed annular cores, such as are used in loading coils for telephone circuits. Such a winding machine may consist of a combined power driven winding and a spool or shuttle ring which passes through the center of the core while the same is oscillated about its axis, the wire being drawn from a stationary supply and wound upon the shuttle portion of the ring and then applied to the core in a well known manner.

An object of this invention is to provide a generally improved winding machine wherein annular objects may be wound at high speed with great facility and with the maintenance of the desired tension in the winding material at all times.

In accordance with one embodiment of this invention as applied to a telephone loading coil winding machine, there is provided a one-piece combined winding and spool or shuttle ring adapted to be interlinked with an annular core or the coil removed therefrom at a single joint in the ring. Slidably carried by the ring is a two-piece wire guide and tension device bearing on the inner and outer peripheries of the ring. At a point opposite the core where the greatest pull on the wire takes place as the wire guide and tension device moves therepast the wire is momentarily frictionally gripped between the periphery of a resilient wheel and the end face of a pinion which drives the ring, whereby the wire is momentarily retarded and sufficient slack produced therein to maintain the desired tension in the wire at all times.

Other objects and advantages of this invention will more fully appear from the following detailed description, taken in connection with the accompanying drawings in which Fig. 1 is a fragmentary plan view, partly in section, of a winding machine embodying the features of this invention;

Fig. 2 is a side view thereof;

Fig. 3 is a fragmentary side view showing different positions of the winding ring and wire guide and tension device relative to the core being wound during the rotation of the ring and the path assumed by the wire in different positions;

Fig. 4 is a fragmentary enlarged detail side view of the winding and shuttle ring carrying the two-piece wire guide and tension device;

Fig. 5 is a fragmentary plan view of Fig. 4;

Fig. 6 is an enlarged sectional view taken on the line 6—6 of Fig. 4;

Fig. 7 is an enlarged vertical section taken on the line 7—7 of Fig. 4;

Fig. 8 is a fragmentary elevational view taken on the line 8—8 of Fig. 4;

Fig. 9 is an enlarged vertical sectional view taken on the line 9—9 of Fig. 4, and Fig. 10 is an enlarged vertical sectional view taken on the line 10—10 of Fig. 4.

Referring now to the drawings, particularly Figs. 1 and 2, a one-piece combined winding and shuttle ring 10 is rotatably supported upon and laterally guided by a set of idler rollers 11 suitably journaled upon a frame 12 (fragmentarily shown) of the machine. The inner peripheral surface of the ring 10 is provided with gear teeth 13 and at each side of the latter there are annular tracks 14 (Fig. 6) engaged by peripheral surfaces of the rollers 11 which are formed with an annular channel 15 (Fig. 1) for the purpose of clearing the teeth 13, the parallel inner walls of the channel serving to guide the ring laterally. Meshing with the internal gear teeth 13 of the ring 10 is a pinion 17 fixed to a shaft 18 which is connected to a suitable driving means (not shown) whereby the pinion and the ring may be driven during the core winding operation in a counterclockwise direction, as indicated by the arrows (Fig. 2), the speed of the winding ring being variable by means included in the drive to the pinion. It is also to be understood that the direction of rotation of the winding ring is reversed when a shuttle portion 19 thereof is being filled with wire in preparation for the winding of the core and means for reversing the direction of rotation of the pinion 17 and thereby the ring is included in the drive to the pinion.

A core 20 (Figs. 1 and 2) to be wound is held in a horizontal plane in interlinked relation with the winding and shuttle ring 10 by clamp members 21, shown fragmentarily, in such a way that the core may be oscillated about its axis during the winding operation to guide wire 22 which is being applied to the core through a portion of the circumference thereof. The clamp members 21 may be oscillated by hand or preferably by gearing connected to a driving means (not shown). When a portion of the core 20 has been wound, the core may be removed from between the clamping members 21 and turned around whereupon the other portions may be wound in the same manner. Since the means for driving the pinion 17 at variable speeds in either direction and for oscillating the clamp members 21 form no part of this invention, a detailed description and disclosure thereof are not deemed necessary to a full understanding of the features of this invention.

The means hereinbefore mentioned for momentarily frictionally gripping the wire 22 at a point opposite the core 20, where the greatest pull on the wire takes place, during the winding operation, which action results in the wire being momentarily retarded and sufficient slack produced therein to prevent undue tension or breakage of the wire comprises the following mechanism.

Fixed to a shaft 25 angularly disposed relative to the axis of the winding and shuttle ring and journaled in a bracket (not shown) carried by the frame 12 is a wheel 26 of any suitable resilient material, such as leather or rubber, preferably the latter, having a beveled peripheral face 27 which presses against an outer flat end face 28 of the pinion 17 at the right side of its axis (Figs. 1 and 3), the pressing engagement of the rubber wheel face 27 against the pinion end face 28 effecting a counterclockwise rotation of the rubber wheel similar to the direction of rotation of the pinion 17 during the winding operation. It will be noted that since the point of contact between the wheel and pinion is nearer the center of the pinion than the point at which the wire leaves the guide on the ring the upward speed of the wire at the former point will be less.

A stationary plate 31 is fixed to the machine frame 12 and is formed with openings for the passage of the core 20 and the pinion 17, the end face 28 of the latter being disposed in the plane of the outer surface of the plate. Pressing against the outer surface of the plate 31 at its left side (Figs. 1 and 2) is an L-shaped spring plate 32 suitably fixed to the machine frame 12. The purpose of the spring plate 32 is to guide and hold the wire 22 taut as it travels towards the core 20 during a portion of the revolution of the ring 10 when the wire becomes slack as the wire guide and tension device carried by the ring approach the core, the wire being pressed against the surface of the plate 31 by the spring plate 32 as it travels towards the core.

Bearing against the outer surface of the plate 31 at its right side above the rubber wheel 26 (Figs. 1 and 2) is an I-shaped end of a wire spring 33 suitably fixed at its opposite end to the machine frame 12. The spring 33 serves to momentarily grip or retard the wire 22 during its passage between the I-shaped end thereof and the plate 31 as it travels towards the spring plate 32 and the core 20 during that portion of the revolution of the ring 10, hereinbefore mentioned, when the wire is becoming slack. The gripping or retarding of the wire at this point insures that it will be held in an open guide groove of the fast moving guide to be presently described.

The one-piece combined winding and spool or shuttle ring 10 and two-piece wire guide and tension device slidably carried thereon are illustrated in detail in Figs. 4 to 10, inclusive. A single laterally extending joint 35 is formed in the ring 10, the joint comprising a central portion disposed at right angles to the sides of the ring and terminating at opposite sides in diagonally directed portions providing beveled faces and a tongue, indicated at 36 (Fig. 8). Suitably secured by brazing or otherwise in a slot 37 formed in the forward face of the ring is a key 38 which extends from either side of the joint 35 (Fig. 4), the key being secured to the portion of the ring above the joint as viewed in Figs. 4 and 8 and is slip fitted in the portion of the slot below the joint. To open the ring 10 at the joint 35 in order to interlink a core 20 with the ring or remove a wound coil therefrom, the ring is slightly expanded by pressing upwardly on the ring portion above the joint 35, as viewed in Fig. 2, the degree of expansion being only sufficient to disengage the beveled faces and tongue 36 of the joint. Thereafter the expanded portion of the ring is laterally deflected in a forward direction, as viewed in Fig. 2, the key 38 secured thereto slipping out of the slot 37 in the other portion of the ring and the deflection being only sufficient to provide a passage for either the core 20 or the completed coil. To close the ring 10 the operation of opening it is reversed. The main function of the key 38 which extends across the joint 35 is to prevent the ring 10 from opening in a radial direction which it would have a tendency to do during its high speed rotation.

For the purpose of securing the inner end of the wire 22 which is to be wound upon the shuttle portion 19 of the winding ring 10, in preparation for the winding operation and also for more securely locking the key 38 in the slot 37 after the ring is closed, the portion of the ring below the joint 35 as viewed in Figs. 4 and 8 and the key 38 is provided with radially directed spaced different sized apertures 39 for accommodating several diameters of wire, which the winding machine is capable of handling. The free end of the wire 22 to be wound upon the shuttle portion 19, in preparation for the winding of the core, is threaded from the outer periphery of the ring through the selected continuous aperture 39 in the ring and the key, until a short length of the wire extends from the inner periphery of the ring and into the path of a combined wire guide and tension device 41 slidably carried by the ring and which at this time is positioned above the joint 35 as shown in Fig. 4. In the operation of winding the core 20 the first time the tension device 41 moves past the joint 35 the end of the wire 22 lying in the path of the tension device will be sheared off by the coacting surfaces of the ring and tension device, as may be clearly observed from Fig. 7.

Slidably mounted upon the ring 10 at its forward side, as viewed in Fig. 4 and also shown in Figs. 5, 7, 9, and 10 is the two-piece wire guide and tension device 41 comprising a slide or wire tension member 42 carrying a wire guide 43. The slide 42 is U-shaped and follows the curvature of the ring on its forward side face as well as upon its outer and inner peripheries. Integral tensioned spring arms 44 of the U-shaped slide 42 are arranged to bear on the outer and inner peripheries of the ring to provide a desired resistance to movement of the slide on the ring and thus serve to impart tension to the wire during the winding operation, which will be described fully hereinafter. The wire guide 43 (Figs. 4, 5, 9 and 10) is interconnected to the slide 42 by means of a headed key or tongue 45 at one end thereof fitting between cooperating opposed shouldered surfaces formed on the spring arms 44 of the slide 42. Formed in the outer side face of the free end of the wire guide 43 is a V-shaped open groove 48 having angularly arranged arms extending diagonally from the forward or lower face of the ring, as viewed in Figs. 4 and 5, respectively, to the opposite side of the guide 43 and to the shuttle portion 19 of the ring for guiding the wire 22 stored therein, therefrom to the forward face of the ring and thence to the core 20. The free end of the wire guide 43 terminates in a shouldered or apron portion 49 which, it will be noted as viewed in Fig. 5, facilitates the threading of the wire 22 from the shuttle portion 19 of the ring, associating it with the guide groove 48 and securing it to the core 20 to be wound in preparation for the winding operation.

The two piece interlocked wire guide and tension device 41 has certain economical advantages other than the elimination of difficulties encountered in manufacturing it in one piece. For instance, the arms 44 of the tension member 42 require spring tempering to provide the required tension while the guide 43 requires case hardening to resist wear from the abrasive action of the wire 22 passing thereover and it frequently happens that one needs replacement before the other, in which case it may be readily slipped off the open ring 10 and a new part coupled to the remaining part which is still useful. Also, tension members 42 having different degrees of tension may be stocked for use and selected according to the particular type of coil to be wound, or the wire used, in which case the desired member may be readily coupled to the guide 43.

The operation of winding the core 20, assuming that the shuttle portion 19 of the ring 10 has been filled with a suitable supply of wire 22, the inner end thereof being secured in the aperture 39 of the ring and key 38 and the outer end portion of the wire led from the shuttle portion 19 and entered in the V-shaped groove 48 of the guide 43 and then passed between the spring plate 32 and the plate 31 and tied to the core 20 is as follows:

As viewed in Fig. 2 the ring 10 rotates in the direction of the arrow and carries the combined wire guide and tension device 41 through the center of the core 20 while the later is oscillated about its axis and thus the wire 22 is wound upon the core 20. It will be obvious that the wire 22 will be withdrawn from the combined winding and shuttle ring 10 in the operation of winding the core 20 at a non-uniform rate, since the segment of the core around which the wire is being wound at any instant is not concentric with the winding ring. Because of this, there is intermittent tension and slackness produced in the wire which limits the speed and proper functioning of the machine.

To overcome the limitations to the speed of winding and proper functioning inherent in this general type of winding machine the improved tension regulating devices hereinbefore described are provided, the operation of which will now be described in detail.

In the rotation of the ring 10 from the position shown in Fig. 2 wherein slackness is indicated in the wire 22 by the irregular shaped loop therein between the guide 43 and the core 20 the wire is held taut as it is wound upon the core due to its passage between the stationary and spring plates 31 and 32, respectively, thus providing a uniform lay of the wire on the core. Upon the tension device 41, moving with the ring 10, as viewed in Fig. 2, passing through the center of the core 20 and reaching a point along the lower half of its travel the slackness in the wire between the guide 43 and the winding on the point of the core will be taken up. This results in increased tension in the wire, since the ring tends to carry the tension device 41 around with it due to the spring arms 44 bearing on the outer and inner peripheries of the ring.

The tension in the wire increases as the ring carries the guide 43 along the lower half of its travel and the combined wire guide and tension device 41 slides backward on the ring while being carried forward therewith and this serves to prevent harmful tension in the wire while still maintaining sufficient tautness therein. As the guide 43 approaches a point substantially diametrically opposite the core the resistance of the combined guide and tension device 41 to slide backward on the ring is greatly increased due to the angle of the wire between the guide 43 and the core 20 and therefore at this point the greatest tension is exerted on the wire. This is clearly shown in Fig. 3 by the full line position of the guide and the wire relative to the core. At this point the wire passing over the advancing guide 43 (Fig. 3) is carried upwardly between the beveled peripheral face 27 of the rotating rubber wheel 26 and the flat outer end face 28 of the ring driving pinion 17, which also drives the wheel 26 and the wire is momentarily frictionally gripped therebetween, the cooperating gripping action of the wheel and pinion upon the wire is such that the latter is momentarily retarded, since the contact point between the wheel and pinion is traveling at a lesser speed than the ring, as hereinbefore described, while moving upwardly as indicated by the angular formation of the wire shown at 53 (Fig. 3) which serves to slide the combined wire guide and tension device 41 slightly backward on the ring and thus sufficient slackness is produced in the wire to prevent harmful tension in or breakage of the wire at this point where the greatest tension on the wire occurs.

Upon the guide 43 moving with the ring 10 carrying the wire 22 from between the rubber wheel 26 and the end face 28 of the pinion 17 there will be no further tendency of the tension device 41 to move backwardly upon the ring 10 until the guide 43 has again passed through the center of the core 20, since slackness is produced in the wire while the guide is advancing toward the core along the upper half of its travel. The wire 22, after passing the rubber wheel 26, is momentarily gripped and retarded, as indicated by the angular formation of the wire at 54 (Fig. 3), by its passage between the eye-shaped end of the wire spring 33 and the plate 31, hereinbefore described, to insure its being held in the open groove 48 of the fast moving guide 43 while slackness is forming therein. In the continued advance of the ring 10 with the tension device 43 the slackness indicated in Fig. 2 is formed in the wire and the operation of winding the core 20 continues, as described heretofore, until the first portion of the core has been wound whereupon the machine is stopped, the clamps 21 are released, the core removed, turned around and the other portions thereof wound in similar manner.

Although the invention has herein been illustrated and described in connection with one embodiment thereof as applied to a particular type of winding machine, it is to be understood that the novel features thereof are capable of various other applications limited only by the scope of the appended claims.

What is claimed is:

1. A winding and spool ring for machines for winding strand material around closed cores comprising a one-piece ring having a single irregular shaped joint extending laterally across from side to side thereof capable of being opened by the deflection of the ring in a plurality of directions at the joint to permit the interlinking of the ring with a core.

2. A winding and spool ring for machines for winding strand material around closed cores comprising a one-piece ring having a single joint extending laterally across the ring from side to side thereof, the ring at the joint having cooperating interlocking abutting faces capable of being separated by the deflection of the ring in a plurality of directions at the joint to permit the interlinking of the ring with a core.

3. A winding and spool ring for machines for winding strand material around closed cores comprising a one-piece ring having a single joint extending laterally across the ring from side to side thereof, opposite faces of the ring at the joint having cooperating tongue and groove formations, and a key secured in an end face of the ring at one side of the joint with a portion thereof removably fitted in a slot formed in the ring at the opposite side of the joint for preventing radial displacement of the ring at the joint, the opposite faces of the ring at the joint being separated by the deflection of the ring in a plurality of directions to permit the interlinking of the ring with a core.

4. In a machine for winding strand material around closed cores, a driven winding and spool ring concentrically disposed relative to and interlinkable with a core, a guide slidably mounted on said ring for guiding the strand from the ring to the core, and integral means removably attached to said guide and slidably directly frictionally engaging the ring for causing the guide to move in unison with the ring to provide tautness to the strand and permitting a backward movement of the guide on the moving ring when the tension in the strand becomes excessive.

5. In a machine for winding strand material around closed cores, a driven winding and spool ring concentrically disposed relative to and interlinkable with a core, a guide slidably mounted on said ring for guiding the strand from the ring to the core, and a bifurcated member mounted on the ring and coupled to said guide, said guide and member having interlockable ends to permit ready replacement of one or the other on the ring, the furcations of said member being tensioned and slidably frictionally engaging opposite surfaces of the ring for causing the guide to move in unison with the ring to provide tautness to the strand and permitting a backward movement of the guide on the moving ring when the tension in the strand becomes excessive.

6. In a machine for winding strand material around closed cores, a driven winding and spool ring concentrically disposed relative to and interlinkable with a core, a guide slidably mounted on a side face of and embracing inner and outer peripheral surfaces of the ring for guiding the strand from the ring to the core, and means removably attached to said guide and slidably frictionally engaging said side face of and embracing inner and outer peripheral surfaces of the ring for causing the guide to move in unison with the ring to provide tautness to the strand and permitting a backward movement of the guide on the moving ring when the tension in the strand becomes excessive.

7. In a machine for winding strand material around closed cores, a driven winding and spool ring concentrically disposed relative to and interlinkable with a core, means carried by said ring for guiding the strand from the ring to the core, and cooperating members, one of which is resilient, between which the strand travels after leaving said guide for guiding and maintaining tautness in the strand at its point of application to the core.

8. In a machine for winding strand material around closed cores, a driven winding and spool ring concentrically disposed relative to and interlinkable with a core, means carried by said ring for guiding the strand from the ring to the core, and cooperating resilient and stationary members within the inner periphery of said ring between which the strand travels after leaving said guide for guiding and maintaining tautness in the strand at its point of application to the core.

9. In a machine for winding strand material around closed cores, a driven winding and spool ring concentrically disposed relative to and interlinkable with a core, means movable on and carried by said ring for guiding the strand from the ring to the core, and means disposed in the path of the strand and effective thereon at the point where the greatest tension is exerted therein for altering the position of the guide on the ring to relieve the tension on the strand.

10. In a machine for winding strand material around closed cores, a rotatable winding and spool ring concentrically disposed relative to and interlinkable with a core, means for driving said ring, means slidably carried on said ring for guiding the strand from the ring to the core, and means driven by said ring driving means and disposed in the path of the strand and effective thereon at the point where the greatest tension is exerted therein for sliding the guide on the ring to relieve the tension on the strand.

11. In a machine for winding strand material around closed cores, a rotatable winding and spool ring concentrically disposed relative to and interlinkable with a core, means for rotating said ring, means slidably carried on said ring for guiding the strand from the ring to the core, and means frictionally driven by said ring driving means arranged to cause the strand to be momentarily gripped between the frictionally engaged surfaces of the member and means adjacent the point where the greatest tension is exerted on the strand, the gripping action on the strand being effective on the guide to cause it to slide backwardly sufficiently on the ring to relieve the tension on the strand.

12. In a machine for winding strand material around closed cores, a rotatable winding and spool ring concentrically disposed relative to and interlinkable with a core, said ring having gear teeth on its inner periphery, a driving pinion for said ring meshing with the teeth of said ring opposite the point of application of the strand to the core, means slidably carried on said ring for guiding the strand from the ring to the core, and a wheel having a beveled peripheral face of yieldable material frictionally engaging a flat end face of the ring driving pinion, the frictionally engaged faces of said pinion and wheel being arranged to receive therebetween the strand during the rotation of said ring, said wheel being driven in the same direction as the ring and at such a speed relative thereto that the strand in its passage therebetween is momentarily gripped adjacent the point where the greatest tension is exerted therein, the gripping action on the strand being effective on the guide to cause it to slide backwardly sufficiently on the ring to relieve the tension on the strand.

13. In a machine for winding strand material around closed cores, a driven winding and spool ring concentrically disposed relative to and interlinkable with a core, means carried by said ring for guiding the strand from the ring to the core, said guide means having an open strand guiding groove, and cooperating members, one of which is resilient, between which the strand travels after leaving the guide means and effective on the strand at a point where slack is accumulating therein for momentarily gripping the strand to insure its being held in the open groove of the guide means.

14. In a machine for winding strand material around closed cores, a driven winding and spool ring concentrically disposed relative to and interlinkable with a core, means carried by said ring for guiding the strand from the ring to the core, said guide means having an open strand guiding groove, and cooperating resilient and stationary members between which the strand travels after leaving the guide means and effective on the strand at a point where slack is accumulating therein for momentarily gripping the strand to insure its being held in the open groove of the guide means.

AMOS L. QUINLAN.